No. 608,983. Patented Aug. 9, 1898.
W. HANSEN.
CAR TRUCK.
(Application filed May 28, 1898.)
(No Model.) 2 Sheets—Sheet 1.
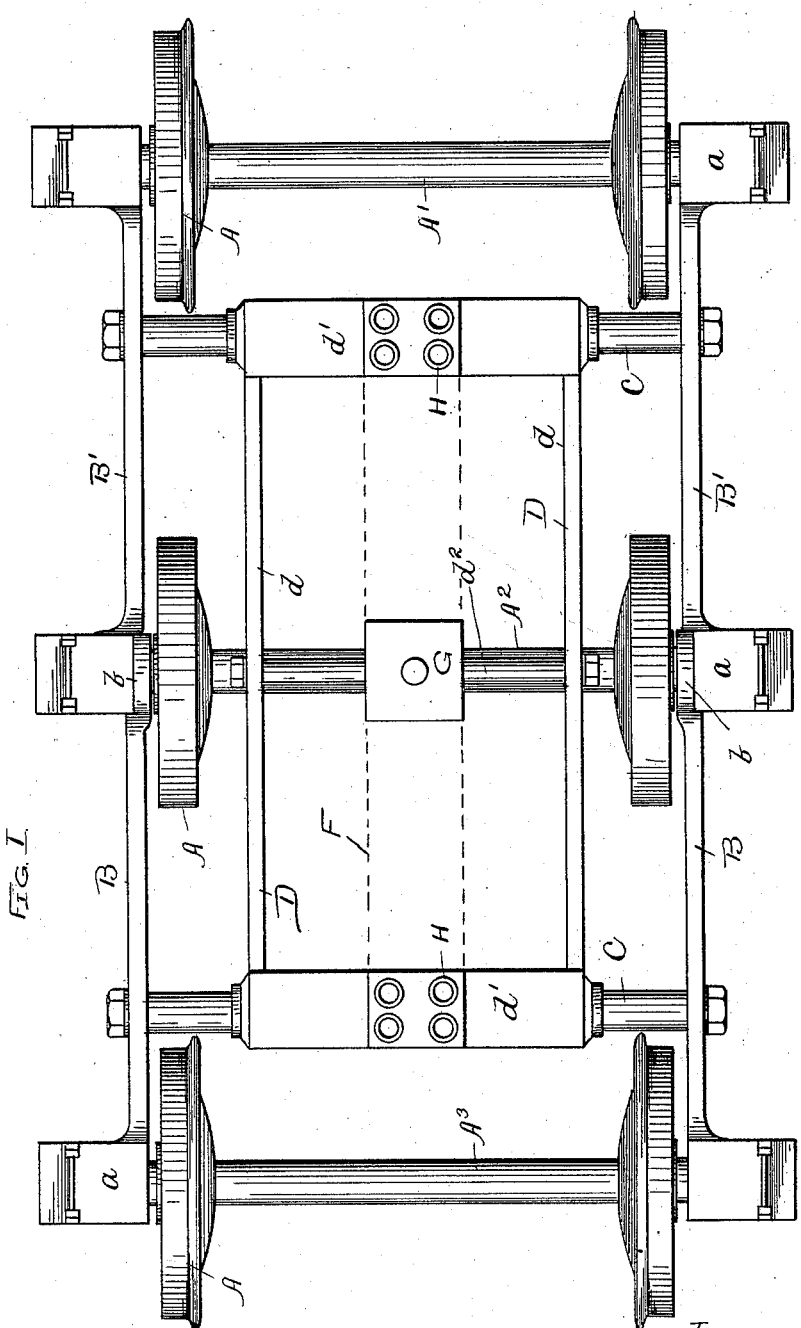
Witnesses:
Geo. E. Curtis
H. M. Munday
Inventor:
William Hansen
By Munday, Evarts & Adcock
His Attorneys No. 608,983. Patented Aug. 9, 1898.
W. HANSEN.
CAR TRUCK.
(Application filed May 28, 1898.)
(No Model.) 2 Sheets—Sheet 2.
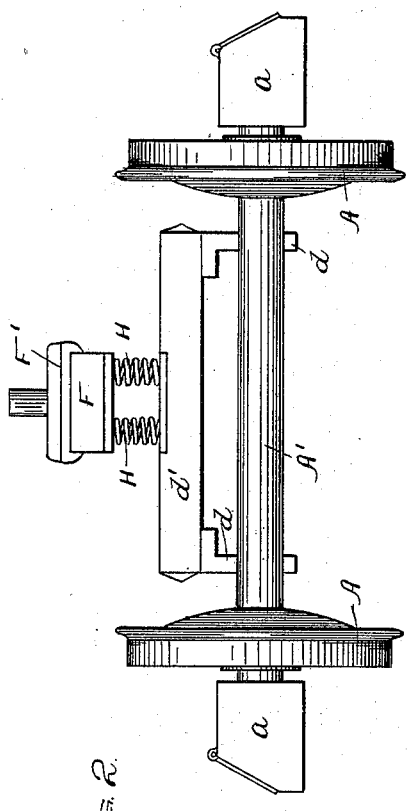
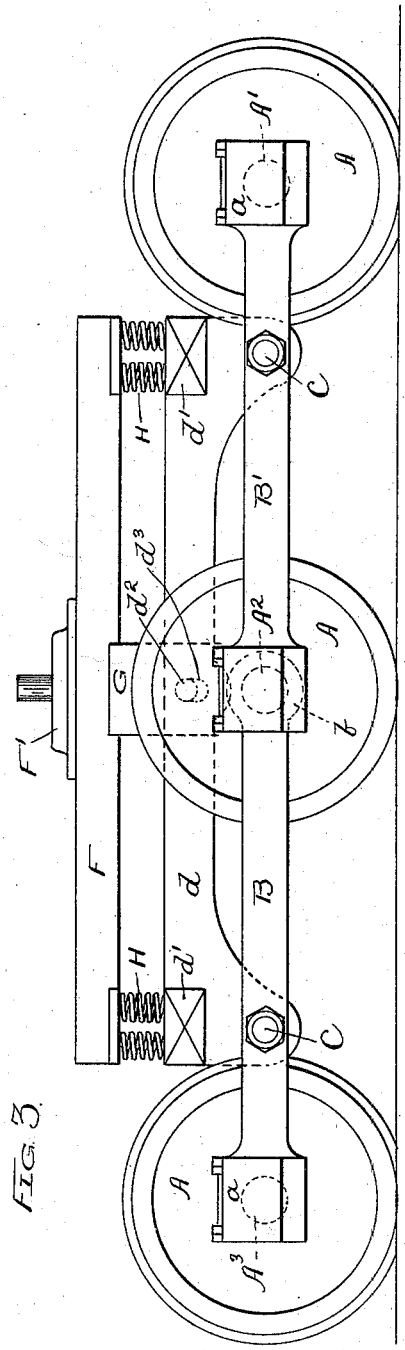
WITNESSES:
Sew. E. Curtis
H. W. Munday
INVENTOR:
WILLIAM HANSEN
BY Munday, Evarts & Adcock,
HIS ATTORNEYS.
THE NORRIS PETERS CO., PHOTO-LITHO., WASHINGTON, D. C.

UNITED STATES PATENT OFFICE.

WILLIAM HANSEN, OF CHICAGO, ILLINOIS, ASSIGNOR TO HIMSELF AND ARNOLD NYDEGGER, OF SAME PLACE.

CAR-TRUCK.

SPECIFICATION forming part of Letters Patent No. 608,983, dated August 9, 1898.

Application filed May 28, 1898. Serial No. 681,975. (No model.)

*To all whom it may concern:*

Be it known that I, WILLIAM HANSEN, a citizen of the United States, residing in Chicago, in the county of Cook and State of Illinois, have invented a new and useful Improvement in Car-Trucks, of which the following is a specification.

My invention relates to improvements in the construction of six-wheel car-trucks.

The object of my invention is to produce a six-wheel car-truck of a simple, strong, efficient, and durable construction by means of which the weight or load may be more evenly and uniformly distributed upon all the wheels of the truck than in the ordinary six-wheel trucks heretofore in use having continuous rigid side frames and by means of which also the vibration or jolting motions communicated to the car-body may be diminished.

With this object in view my invention consists, essentially, in the combination, with the wheels and three car-axles of the truck, of side frames or bars uniting the axles and jointed or hinged together on or at the middle axle and a supplemental frame fitting inside the wheels and bearing upon cross-bars extending between the jointed side frames.

My invention further consists in the novel construction of parts and devices and in the novel combination of parts and devices herein shown and described and specified in the claims.

In the accompanying drawings, forming a part of this specification, and in which similar letters of reference indicate like parts throughout all the views, Figure 1 is a plan view of a six-wheel truck embodying my invention. Fig. 2 is an end view, and Fig. 3 a side elevation.

In the drawings, A A represent the wheels of the truck, A' A² A³ the axles, and $a\ a$ the axle-boxes, these parts being of any ordinary or suitable construction.

B B' B B' are the side frames or side bars of the truck. The side frames or side bars B B' are jointed together at the middle axle instead of being made, as heretofore, in one rigid piece, each of the side frames B B' having an eye $b$ surrounding or engaging the middle axle A², so that all three axles may move up and down independent of each other.

C C are cross-bars transversely uniting the side bars B B and B' B', the cross-bars C C being located, preferably, at or about two-thirds the distance from the middle axle A² to the outer axles A' A³, as illustrated in the drawings, so that the weight of the car-body will be equally distributed on all three axles and all six of the wheels.

D is a supplemental frame fitting inside the wheels and secured to and resting upon the cross-bars C C. This supplemental frame consists, preferably, of a pair of side bars $d\ d$, connected together by cross-bars $d'\ d'$.

F is a center bar to which the center plate F' is secured, and H H are the car-springs interposed between the center bar F and the cross-bars $d'\ d'$ of the supplemental frame D, the car-body resting directly on the center bar F. To form a positive connection between the center bar F and the supplemental frame D, so that the pulling strain of the train will not come upon the springs, the center bar F is furnished with a center block G, rigidly secured thereto, and which center block is connected to the frame D by a cross-bar $d^2$, which passes through the center block G and fits in vertical slots $d^3$ in the side bars $d$ of the supplemental frame, so that the supplemental frame may have a limited up-and-down movement independent of the center bar F, to which the center block G is attached.

I claim—

1. In a six-wheel car-truck, the combination with the three axles with side frames or bars hinged or jointed together at the middle axle, and a supplemental frame resting upon the pairs of jointed side bars, substantially as specified.

2. In a six-wheel car-truck, the combination with the three axles with side frames or bars hinged or jointed together at the middle axle, a supplemental frame resting upon the pairs of jointed side bars, a center bar resting on the supplemental frame, and springs interposed between the center bar and said supplemental frame, substantially as specified.

3. In a six-wheel car-truck, the combination with the three axles with side frames or bars hinged or jointed together at the middle axle, a supplemental frame resting upon the pairs of jointed side bars, a center bar resting on the supplemental frame, springs interposed between the center bar and said supplemental frame, and a center block attached to said center bar and connected to the supplemental frame by a slotted connection to permit the supplemental frame to move up and down independent of the center bar and the car-body or load resting thereon, substantially as specified.

4. The combination in a six-wheel car-truck, of the three axles with side bars B B' B B' having a pivotal connection with the middle axle, cross-bars C C connecting the side bars B B and B' B', a supplemental frame D having side bars $d\ d$ fitting inside the wheels, and cross-bars $d'\ d'$, center bar F, center block G, and springs H, substantially as specified.

WILLIAM HANSEN.

Witnesses:
   LEW. E. CURTIS,
   M. M. MUNDAY.